(12) United States Patent
Smith et al.

(10) Patent No.: US 11,443,868 B2
(45) Date of Patent: *Sep. 13, 2022

(54) TRIPLE CONTAINMENT TARGETS FOR PARTICLE IRRADIATION

(71) Applicant: UCHICAGO ARGONNE, LLC, Chicago, IL (US)

(72) Inventors: Nicholas A. Smith, Lockport, IL (US); David A. Rotsch, Montgomery, IL (US); Sergey D. Chemerisov, Lisle, IL (US); Jerry A. Nolen, Jr., Chicago, IL (US); James L. Bailey, Hinsdale, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 1400 days.

This patent is subject to a terminal disclaimer.

(21) Appl. No.: 15/704,259

(22) Filed: Sep. 14, 2017

(65) Prior Publication Data

US 2019/0080813 A1 Mar. 14, 2019

(51) Int. Cl.
| | |
|---|---|
| *G21K 5/08* | (2006.01) |
| *G21G 1/12* | (2006.01) |
| *G01T 7/02* | (2006.01) |
| *G21G 1/00* | (2006.01) |
| *G01N 1/10* | (2006.01) |

(52) U.S. Cl.
CPC .............. *G21K 5/08* (2013.01); *G01T 7/02* (2013.01); *G21G 1/00* (2013.01); *G21G 1/12* (2013.01); *G01N 2001/1037* (2013.01)

(58) Field of Classification Search
CPC ............ G21G 1/00; G21G 1/12; G21G 1/001; G21G 1/0005; G21G 1/02; G21G 1/04; G21G 1/06; G21G 1/10; G21K 5/08; G21K 5/00; B01L 3/5023; B01L 1/50; G01N 1/10; G01N 2001/1037; G01T 7/02
USPC .................................. 376/202, 156, 158, 190
See application file for complete search history.

(56) References Cited

U.S. PATENT DOCUMENTS

| | | | | |
|---|---|---|---|---|
| 4,782,231 A | * | 11/1988 | Svoboda | G21G 4/08 423/2 |
| 9,837,176 B2 | * | 12/2017 | Diamond | G21G 1/001 |
| 2009/0135990 A1 | * | 5/2009 | Poon | G21C 3/328 376/438 |
| 2011/0002431 A1 | * | 1/2011 | Johnson | H05H 6/00 376/195 |
| 2011/0124948 A1 | * | 5/2011 | Yokell | A61M 5/1407 600/5 |
| 2013/0083882 A1 | * | 4/2013 | Ehst | B01D 7/00 376/202 |

(Continued)

*Primary Examiner* — Darlene M Ritchie
(74) *Attorney, Agent, or Firm* — Cherskov Flaynik & Gurda, LLC (57) ABSTRACT

The invention provides a system for containing irradiated particles, the system having a housing having a closed upstream end and an open downstream end; an axially disposed tunnel extending from the downstream end to the upstream end, wherein longitudinally extending regions of the tunnel define a plurality of threaded surfaces; a sample cup positioned within the tunnel and proximal to the closed upstream end; threaded plugs matingly received by the threaded surfaces so as to provide at least one seal between the sample cup and the atmosphere external of the housing; and a plurality of deformable substrates disposed between the plugs.

17 Claims, 4 Drawing Sheets

(56) References Cited

U.S. PATENT DOCUMENTS

| | | | |
|---|---|---|---|
| 2014/0010338 A1* | 1/2014 | Ehst | G21K 5/08 |
| | | | 376/202 |
| 2016/0040267 A1* | 2/2016 | Stoner | G21G 1/001 |
| | | | 204/157.21 |
| 2017/0004952 A1* | 1/2017 | Nakayama | H01J 37/285 |
| 2017/0213614 A1* | 7/2017 | Conard | C25D 1/003 |
| 2017/0352437 A1* | 12/2017 | Higgins | G21C 3/02 |
| 2019/0221325 A1* | 7/2019 | Schaffer | G21F 5/14 |
| 2021/0335515 A1* | 10/2021 | Schaffer | C25D 13/22 |

\* cited by examiner

FIG. 1

TRIPLE CONTAINMENT TARGETS FOR PARTICLE IRRADIATION

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to containment of materials during irradiation, and more specifically, this invention relates to a system and method for providing triple containment of radioactive materials in a radiation beam.

2. Background of the Invention

Some medical isotopes can only be produced via the irradiation of already radioactive or otherwise hazardous material. When these materials are loaded, irradiated and unloaded from the beam line venue, the potential exists for contamination of the personnel, surroundings, and equipment.

This presents problems for technicians who are the front-line personnel in the production of isotopes for medical and industrial use.

Previous containment solutions have relied upon sealing material in a quartz ampule or welding the sample into a metal packet or container. These solutions have drawbacks. Quartz ampules can over heat (as quartz is not a good thermal conductor) and experience over-pressure failures.

Welding the samples in a metallic packet or container is difficult and often impossible depending on the container material. There is also the high probability for dispersing radioactive target materials and product material upon opening the target holder.

Both state of the art methods make the samples difficult to retrieve without specialized tools and hot cell operations.

A need exists in the art for a system and method for containing material during irradiation, and also after radiation (for example after extraction from the beam and transport to a milking process). The system and method should provide multiple seals. The system and method should also be easily transportable.

SUMMARY OF INVENTION

An object of the invention is to provide a system and method for safely containing and transporting irradiated targets that overcomes many of the drawbacks of the prior art.

Another object of the invention is to provide a system and method for redundant containment of materials irradiated by a radiation beam. A feature of the invention is providing three seals of containment. An advantage of the invention is elimination of contamination of all but the primary capsule physically contacting the materials.

Still another object of the invention is to provide a system for producing medical and industrial isotopes. A feature of the invention is the use of a plurality of compression fittings and reversibly deformable seals without the need for welding. An advantage of the invention is an enhancement of thermal communication between structures within the system, therefore maximizing heat removal from the system during irradiation.

Yet another object of the present invention is to provide a single physical containment capsule for irradiated material. A feature of the invention is that the capsule is sealed behind two gas tight seals in a separate target holder. An advantage of the invention is that it allows for the packing of a hazardous or radioactive target material inside of a primary capsule which then can be sealed and decontaminated prior to introduction into the larger, gas-tight holder.

Briefly, the invention provides a system for containing hazardous materials for irradiation purposes, the system comprising a housing having a permanently (e.g., an integrally molded) closed upstream end and an open downstream end; an axially disposed tunnel extending from the downstream end to the upstream end, wherein longitudinally extending regions of the tunnel define a plurality of threaded surfaces; a sample cup positioned within the tunnel and proximal to the permanently closed upstream end; threaded plugs matingly received by the threaded surfaces so as to provide at least one seal between the sample cup and the atmosphere external of the housing; and a plurality of deformable substrates disposed between the plugs.

Also provided is a method for isolating irradiated samples, the method comprising placing a non-irradiated sample in a capsule; reversibly sealing the capsule proximal to an upstream end of a target containment housing; imposing a plurality of reversible hermetic seals within the housing and downstream from the capsule; irradiating the non-irradiated sample for a time and at a power density to obtain desired isotope; removing the hermetic seals; and removing the capsule. The method requires no welding, so as to be weld-less.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a redundant sealing system and method for isolating material irradiated in a radiation beam. The radiation beam may comprise particles selected from the group consisting of photons, electrons, protons, neutrons, and combinations thereof, and supplied in an energy range of between 0 MeV and 200 MeV.

A version of the invention allows for the insertion and removal of friable, loose or radioactive targets into a capsule positioned within a cooling target holder (or submerged in a bath of flowing coolant) while the target holder provides two gas-tight seals. The coolant maintains the system at temperatures below the boiling point of water (100° C.).

Recovery of the sample is contamination free inasmuch as the sample material is not primarily contained by the target holder but instead by a removable capsule. This also allows the target holder to be re-used with multiple capsules. No known method, aside from welding the targets closed, provides this level of containment while retaining the ability to easily recover the material.

Figure 1:
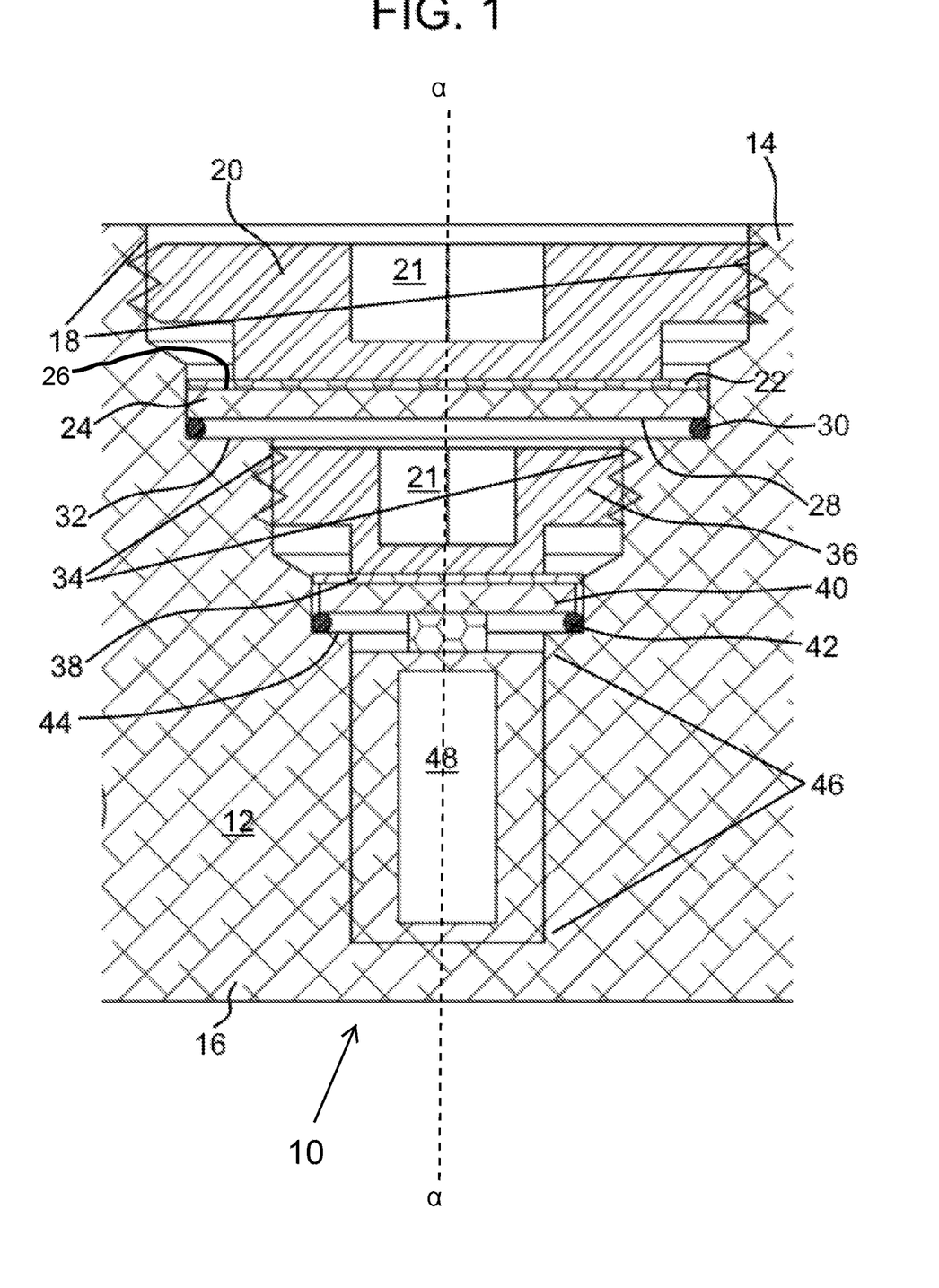
FIG. 1 is a schematic elevational view of a redundant seal system for isolating irradiated material, in accordance with features of the present invention.

FIG. 1 depicts a version of the invented system, the version designated generally as numeral 10, shown fully assembled. A housing 12 is provided with a first end 14 and a second 16 end. The first end 14 defines a threaded opening 18 adapted to receive a first threaded plug 20. This first plug 20 is the first hermetic seal of the system. It applies axial pressure to the seat of the first threaded aperture seal of the system. A countersunk female socket 21 may be provided for this and other plugs described herein to impart rotational motion to the plug for installation and removal.

Positioned immediately inferior from the first threaded plug is a compressible substrate formed into a disk 22. The disk 22 comprises material that is thermally conductive, and that has a high tolerance to heat (at least to about 200° C. before melting).

Inferior to the disk 22 is a first compression plate 24 having a first, upwardly facing surface 26 and a second downwardly facing surface 28. The disk 22 is therefore positioned so as to be between the plug 20 above and the plate 24 below. The disk 22 is in physical contact with a lubricant (grafoil disk or lubricating application) and the plate.

An O-ring or disk 30 physically contacts the periphery of the downwardly facing surface 28 of the plate 24. At this point interior portions of the housing define a first medially extending shoulder 32 or circular shelf circumscribing a second threaded aperture 34. The shelf is generally orthogonal to the longitudinal axis a of the housing. Downwardly facing surfaces of the O-ring or disk 30 contact the shelf so as to be compressed against it when the first plug 20 is nested within the first threaded aperture 18. In light of the foregoing, during assembly, the first plate 24 is forced down upon the O-ring or disk so as to compress the O-ring or disk. The compression disk 22, simultaneously contacting a downstream facing surface of the plate and an upstream facing surface of the plug 20 serves as a lubricant to assure that it, and the compression plate is translated straight down with minimal rotation so as to maximize fidelity of the O-ring or disk seal. This compression interaction forms a first hermetic seal within the housing.

The second threaded aperture 34 is adapted to matingly receive a second threaded plug 36 in a male-female configuration. In contact with the underside of the plug 36 is a second deformable disk 38 (perhaps graphite, or material similar to that comprising the first deformable disk 22). This disk 38 is positioned between the second plug 36, and a second compression plate 40.

Positioned inferior from, and in contact with the second compression plate 40 is a second O-ring or disk. An upwardly facing side of the second O-ring or disk 42 contacts the periphery of the second compression plate 40. At this point within the housing, the housing 12 defines a second medially directed shoulder 44. A downwardly facing side of the second O-ring 42 or disk contacts the second shelf 44 and is compressed against it when the second threaded plug 36 nests within the second threaded aperture 34. This compression forms a second hermetic seal within the housing 12.

Situated beneath the second hermetic seal is a container 46 adapted to slidably receive a capsule 48. The capsule 48 contains radioactive material as a solid (such as in loosely aggregated, pelletized, evaporated etc forms). Alternatively, larger pressed pellets of radioactive material may be introduced directly into the container 46.

Figure 2A:
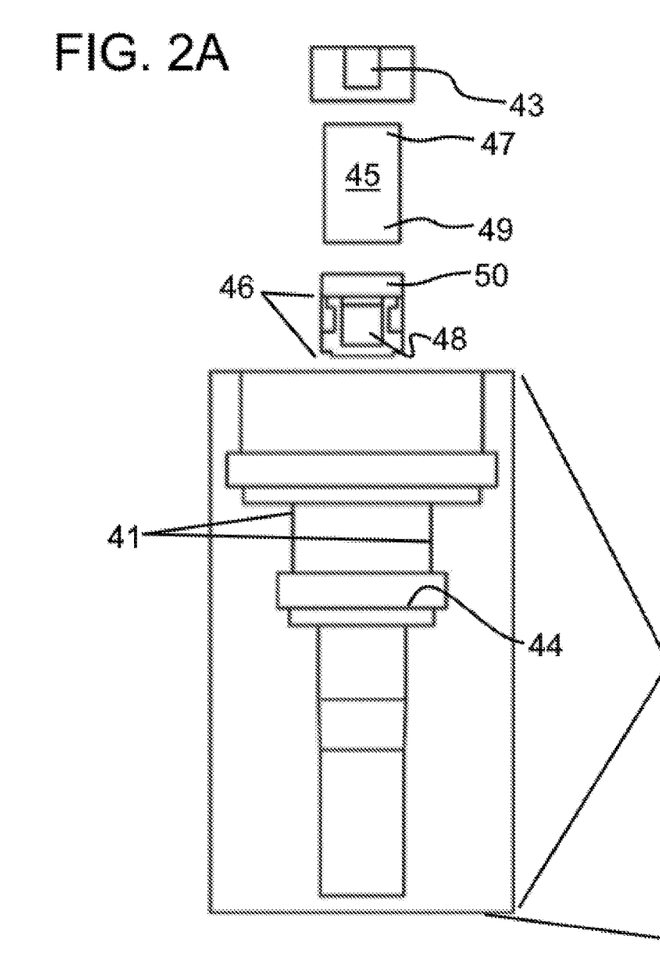
FIGS. 2A-D are schematic elevational views of another seal system, in accordance with features of the present invention.
Figure 2B:
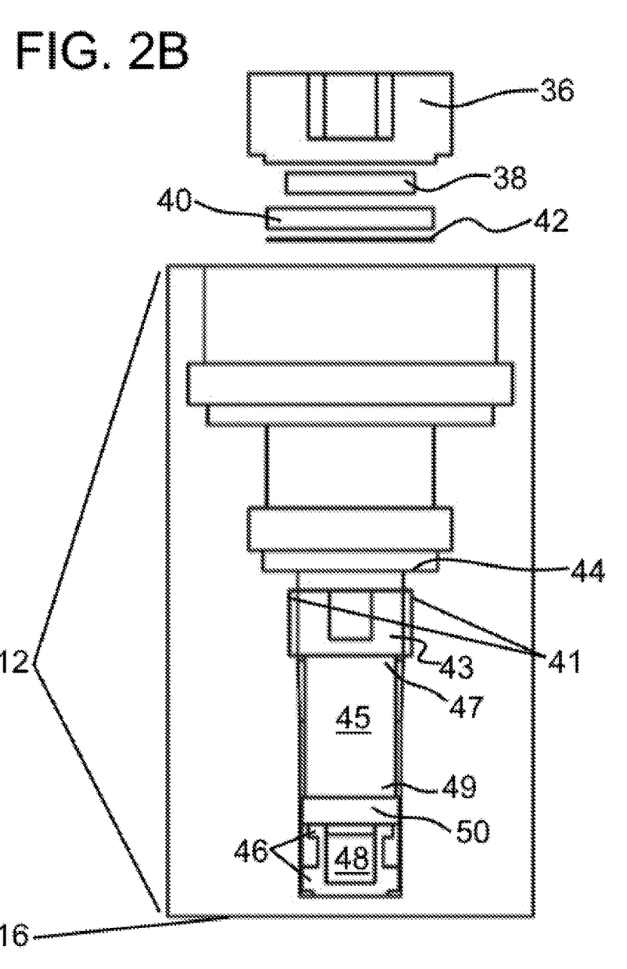
Figure 2C:
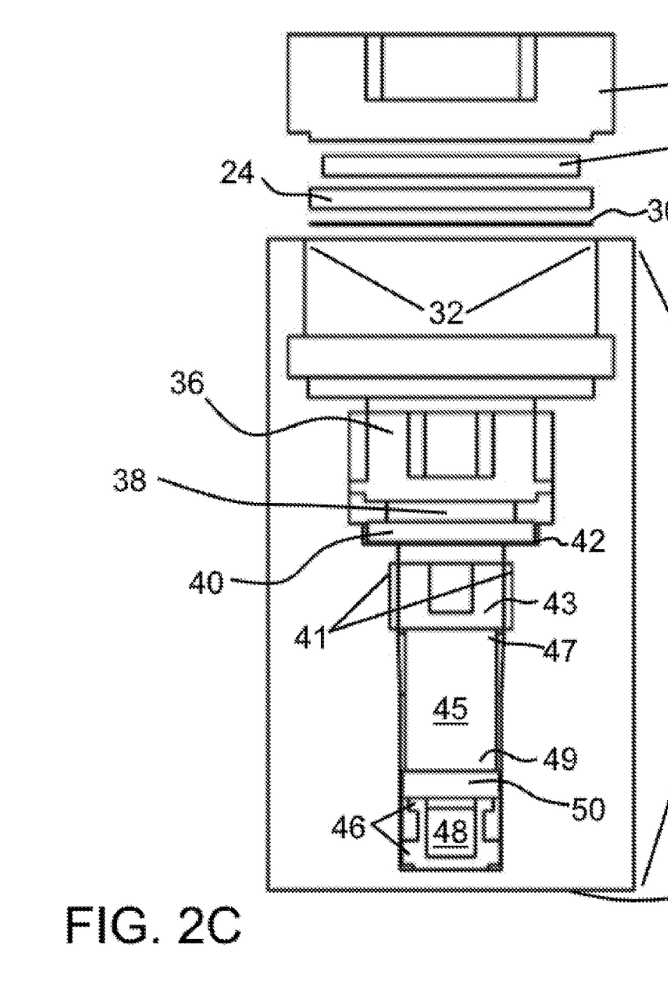
Figure 2D:
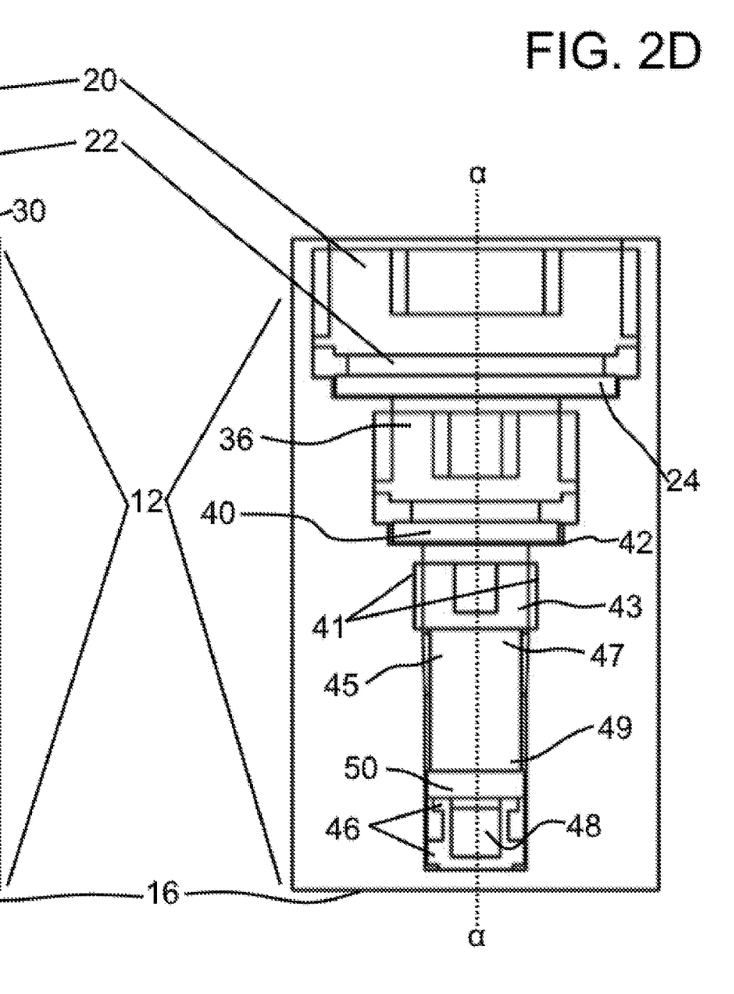

FIGS. 2A-D depict another version of the invented sealing system. FIG. 2D depicts the fully assembled version, while FIGS. 2A-C depict exploded views of aspects of the version.

One difference between this version and the version depicted in FIG. 1 is the inclusion of a third male-female plug-aperture arrangement, wherein a third threaded aperture 41 is adapted to receive a third threaded plug 43. This third plug 43 imparts axially extending, compressive force to structures in thermal communication with it. This third male-female aperture arrangement is positioned above another additional feature, which is a graphite monolith 45 positioned in between the third threaded plug 43 and the container 46 holding the capsule 48.

A myriad of materials can comprise the graphite monolith, for example stacked flexible sheets, or rolled sheets of Grafoil®, commercially available from GrafTech of Cleveland Ohio. For example, Grafoil® disks approximately 1/16" in thickness may be stacked upon each other to a height commensurate with imparting a snug fit of the stack between flanking structures. The diameter of the disk may also be determined empirically to impart a snug fit along longitudinally extending regions of the disk stack with adjacent structures. In one iteration, disk diameters of approximately 1/4" are utilized.

The graphite monolith 45 depicted in FIG. 2 is reversibly deformable, at least along its longitudinal axis dimension, wherein its longitudinal axis is coaxial to the longitudinal axis (a in FIG. 1) of the system. As such, the graphite monolith acts as a spring to impart downward force on the capsule 46 to ensure contact between the capsule 46 and the interior bottom of the housing. This deformable feature provides a means for enhancing physical contact, and therefore thermal conductance with structures contacting the exterior surfaces of the housing 12. For example, when the third plug 43 is fully nested within its threaded aperture 41, the depending end of the plug contacts a first end 47 of the monolith and forces the monolith 45 in the opposite direction, thus forcing the capsule 46 into intimate contact with the housing 12.

Optionally, a sheet of aluminum, gold, or other malleable, relatively inert substrate is placed beneath the capsule so as to be positioned between the capsule and the interior bottom of the housing. Upon the above described axial pressure being imposed by the graphite monolith, 45, the substrate sheet is deformed, thereby enhancing physical contact and therefore thermal conductance between the capsule and the housing.

The second end 49 of the monolith is forced against a cap 50 positioned at the top of the sample container 46. This forces the sample container 46 against the interior bottom surface of the housing 12 that is proximal to the second end 16 of the housing. As such, intimate physical contact is established between the depending end of the sample container and the floor of the housing. The consequence to this contact is enhanced thermal conductance between these structures. It is the exterior of the housing that is in physical contact with coolant and this coolant serves as a heat sink to wick away heat built up in the container 46 and its respective capsule 48.

In either iteration of the system, as noted supra, thermally conductive, deformable material may be placed between a depending end of the sample cup 48, and the bottom of the interior of the housing 12. Therefore, when the entire system is battened down, physical contact between the sample cup and the bottom of the interior of the housing 12 is assured. At a minimum, thermal conductance through the structure facilitates smoother operation of the system by minimizing structural fatigue and deformation of threaded parts. Thermal conductance stops the system from melting; therefore, thermal conductance eliminates catastrophic failure.

In assembly, a sample (e.g., loose aggregate, compressed pellet, or evaporated residue) is first placed into the sample capsule 48 or sample cup. The sample capsule 48 is then placed into its respective cavity 46. Then, in the case of the system depicted in FIG. 2, the deformable monolith (such as layers of grafoil) 45, are placed to backfill the cavity, 46.

The third plug, 43, is inserted and tightened to apply force onto the deformable monolith 45 and subsequently onto the sample capsule 48. The O-ring or disk, 42, is placed upon the periphery of the sealing surface and overlaid with the second compression plate 40. A grafoil or lubricating piece, 38, is then overlaid on the compression plate 40 and the second plug 36 is threaded into place applying force onto 40 and subsequently onto the disk 42 and second shelf 44 thus creating a hermetic seal. This is then repeated with the first plug, 20. The O-ring or disk is seated onto the sealing surface and overlaid with the second compression plate, 24 (FIG. 1). A grafoil or lubricating deformable disk (such as graphite) 22 is then overlaid on the compression plate 24 and the first plug 20 is threaded into place applying force onto the disk 22 and subsequently onto the plate 24 and ultimately the O-ring or disk thus creating another hermetic seal.

Continuing in the direction opposite that of the sample capsule, succeeding structures are similarly assembled as described supra. The result is a structure with two removable male female seals (FIG. 1) or three removable male-female seals (FIG. 2).

A salient feature of the invented system is the elimination of any welds. This allows the systems to be dismantled and their parts reused after the irradiated sample is harvested from the housing.

Another salient feature of the invented system is its thermal conductance characteristics wherein the primary capsule 48 is in intimate physical contact with adjacent structures. Heat dissipation is key inasmuch as the components will be bombarded with radiation beams, such as electron beams and photon beams.

Figure 3:
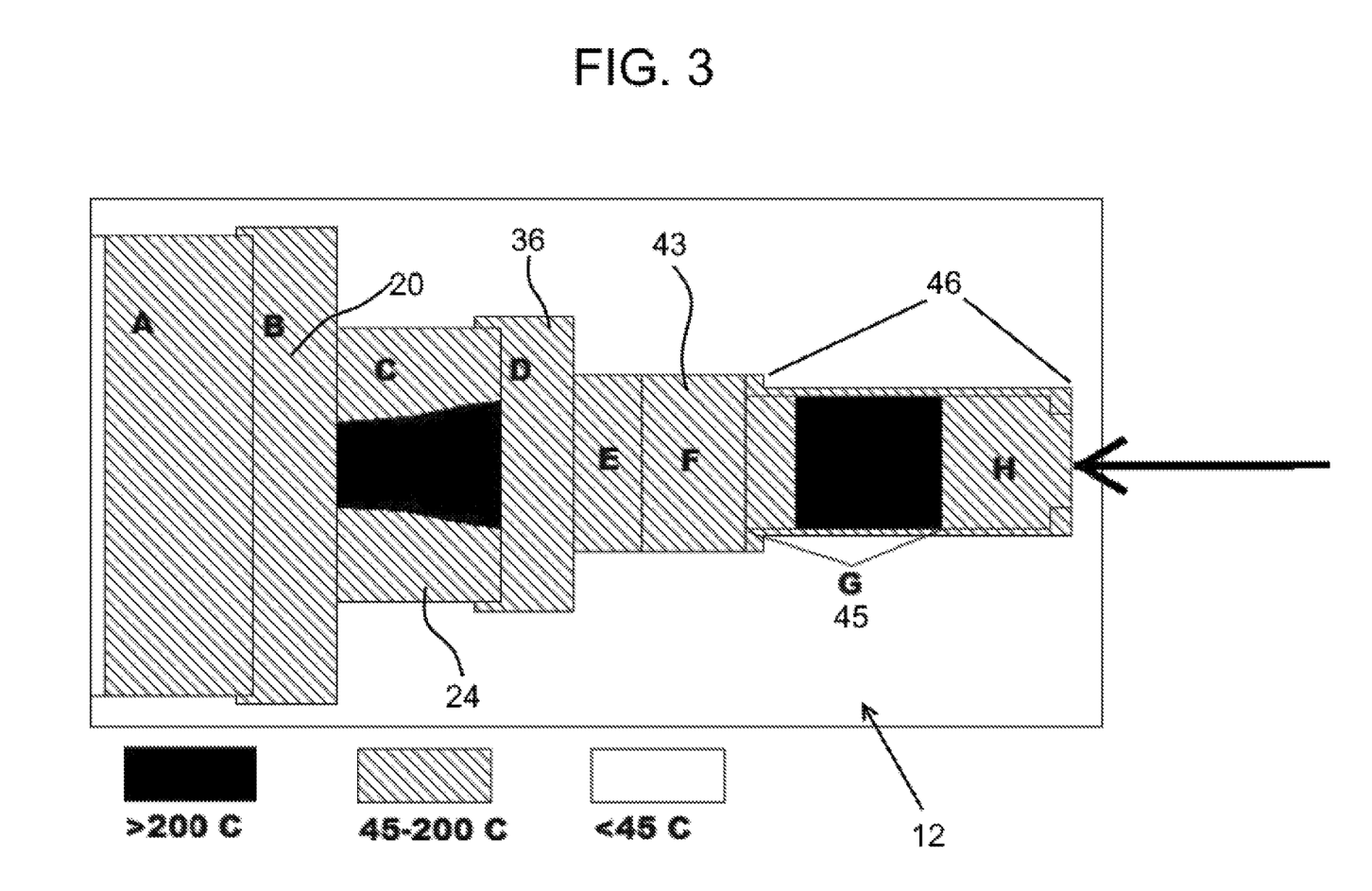
FIG. 3 is schematic of a heat map of the system during operation, in accordance with features of the present invention.

FIG. 3 is a thermal schematic of the heat load on the various components comprising the system. The components of the system are similarly numbered to those depicted in FIGS. 1 and 2. Black regions of FIG. 3 are the hottest during irradiation, with temperatures exceeding 200° C. Grey scale regions are those regions in the area of between 45 and 200° C. White regions are those areas having temperatures less than approximately 45° C.

Radiation impingement upon the system is depicted as a thick black arrow in FIG. 3. Inasmuch as the radiation beam coaxially impinges upon the system at the system's end nearest to the sample capsule, heat generation is highest along the system's longitudinal axis. As discussed supra, the third threaded plug 43, fully nested within its threaded aperture, assures snug physical contact between these components.

Upstream of the beam impingement and the threaded plug 43 in series resides the compression seal 43, the second threaded plug 36, the first compression plate 24, and the first threaded plug. The seals may be made with very thin (e.g., 0.001" to 0.005") pieces of aluminum or gold and placed directly under the compression plates 23, 43.

The system generally dissipates heat due to its componentry providing heat sinks to each other. As can be noted in the heat map depicted in FIG. 3, the housing 12 is maintained at temperatures less than 45° C.

To facilitate additional cooling, the exterior of the housing may be contacted with a coolant. The coolant may directly contact the exterior of the housing or the coolant may be contained in cooling coils, those coils encircling the periphery of the housing and contacting the periphery of the housing. The housing may be partially or fully submerged in coolant that is recirculating. Suitable cooling fluids include, but are not limited to water, organic solvents, salted solutions, gases, byphasic baths, and combinations thereof.

The various components of the target holder 10 may comprise different metals. Generally, the construction materials are thermal conductors. Suitable metals include aluminum, steel, copper, titanium, platinum, their alloys and combinations thereof.

The O-rings may comprise rubber, carbon fiber, aluminum, gold, copper, iron, their alloys, and combinations thereof. The deformable disks 22, 38 may embody a lubricity to confer slidable communication with structures contacting it during target assembly. As such, the disks may be replaced with lubricants such as graphite, molybdenum sulfide, tungsten sulfide, boron nitride or other lubricating materials and combinations thereof.

In operation, and upon assembly, a radiation beam is directed to the upstream end of the system for a time and at a power sufficient to irradiate sample material residing in the sample capsule 48. Upon completion of irradiation, the system is disassembled, the capsule removed, and the process restarted with another sample. Inasmuch as the sample resides in a capsule with a seal dedicated to it (for example the compression plate 40 of FIG. 1 or the cap 50 of FIG. 2), contamination of other components with the system is minimized. Therefore, componentry can be reused, and more importantly, exposure to workers is avoided.

It is to be understood that the above description is intended to be illustrative, and not restrictive. For example, the above-described embodiments (and/or aspects thereof) may be used in combination with each other.

In addition, many modifications may be made to the configurations of the target holder 10 or to the materials comprising the target holder to adapt it to a particular situation without departing from the scope of the invention. While the dimensions and types of materials described herein are intended to define the parameters of the invention, they are by no means limiting, but are instead exemplary embodiments. Many other embodiments will be apparent to those of skill in the art upon reviewing the above description. For example, while the target holder 10 is depicted as cylindrical, it can be any shape, so as to be cylindrical, pyramidal, cubic, rectangular, spherical, irregular so as to conform to adjacent structures, and combinations thereof.

The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system for containing hazardous materials for irradiation, the system comprising:
    a) a housing having a closed upstream end and an open downstream end;
    b) an axially disposed tunnel extending from the downstream end to the upstream end, wherein longitudinally extending regions of the tunnel define a plurality of axially disposed threaded surfaces and medially directed shoulders;
    c) a sample capsule containing the hazardous materials, wherein the sample capsule is encased within a container positioned within the tunnel and proximal to the closed upstream end;
    d) threaded plugs matingly received by the threaded surfaces; and
    e) reversibly deformable disks disposed between the plugs and the medially directed shoulders to provide seals between the container and the atmosphere external of the housing;
    f) a deformable graphite substrate disposed downstream from the container and upstream of the plugs, wherein the deformable graphite substrate is adapted to press the container against the closed upstream end.

2. The system as recited in claim 1 wherein the deformable disks comprise a thermally conductive material selected from the group consisting of graphite, aluminum, gold, steel, brass, iron, copper, their alloys, and combinations thereof.

3. The system as recited in claim 1 wherein the system is resistant up to 250° C.

4. The system as recited in claim 1 wherein two reversible hermetic seals are established by two reversibly deformable disks and a third reversible seal is established by the sample capsule encasing the hazardous materials.

5. The system as recited in claim 1 wherein the closed upstream end is integrally molded to the housing.

6. The system as recited in claim 1 wherein the system can withstand up to 200 MeV of energy from a radiation beam.

7. The system as recited in claim 6 wherein the radiation comprises particles selected from the group consisting of photons, electrons, protons, neutrons, and combinations thereof.

8. The system as recited in claim 1 further comprising a coolant contacting exterior surfaces of the housing.

9. The system as recited in claim 8 wherein the coolant maintains the system at below the boiling point of water.

10. A method for isolating irradiated samples, the method comprising:
    a) placing a non-irradiated sample in a capsule;
    b) encasing the capsule in a container;
    c) reversibly sealing the container proximal to an upstream end of a target containment housing, wherein the upstream end is integrally molded to the housing;
    d) imposing a plurality of reversible hermetic seals within the housing and downstream from the capsule;
    e) irradiating the non-irradiated sample for a time and at a power density to obtain desired isotope;
    f) removing the hermetic seals; and
    g) removing the capsule.

11. The method as recited in claim 10, wherein each of the reversible hermetic seals comprise deformable thermally conductive disks disposed between thermally conductive components of the hermetic seals.

12. The method as recited in claim 11, wherein the components of the hermetic seals comprise a male-female threaded configuration.

13. The method as recited in claim 10 further comprising contacting exterior surfaces of the housing with a coolant for a time and at a temperature sufficient to maintain the housing at a temperature below approximately 50° C.

14. A method for preventing irradiated materials from contaminating the environment, the method comprising:
  a) placing a non-irradiated sample in a capsule;
  b) encasing the capsule in a container;
  c) positioning the container between an upstream closed end of a target containment housing, wherein the upstream closed end is integrally molded to the housing;
  d) contacting sheets of graphite to a downstream end of the capsule;
  e) placing a first deformable disk between the sheets of graphite and an open downstream end of the housing, whereby the first deformable disk and the sheets of graphite are axially compressed by a first male-female threaded coupling positioned downstream of the first deformable disk;
  f) reversibly sealing the first male-female threaded coupling between the upstream closed end of the target containment housing and a second deformable disk whereby the second deformable disk is axially compressed by a second male-female threaded coupling disposed downstream of the first male-female threaded coupling;
  g) irradiating the non-irradiated sample for a time and at a power density to obtain a desired isotope;
  h) removing the first and second deformable substrates; and
  i) removing the capsule.

15. The method as recited in claim 14 wherein the deformable disks comprise a thermally conductive material selected from the group consisting of graphite, aluminum, gold, steel, brass, iron, copper, their alloys, and combinations thereof.

16. The method as recited in claim 14 wherein the sheets of graphite are configured as a roll and coaxially disposed with the housing.

17. The method as recited in claim 14 wherein the graphite sheets impart an axial force on the capsule to ensure thermal conductance between the container and the atmosphere external of the housing.

* * * * *